US011897311B2

United States Patent
Hadano et al.

(10) Patent No.: US 11,897,311 B2
(45) Date of Patent: Feb. 13, 2024

(54) VEHICLE CONTROL DEVICE, VEHICLE CONTROL METHOD, NON-TRANSITORY STORAGE MEDIUM AND VEHICLE CONTROL SYSTEM

(71) Applicants: TOYOTA JIDOSHA KABUSHIKI KAISHA, Toyota (JP); DENSO CORPORATION, Kariya (JP)

(72) Inventors: Hiroyasu Hadano, Toyota (JP); Takaaki Inokuchi, Nagoya (JP); Tatsunori Katoh, Nagoya (JP); Asuka Marumo, Karita (JP)

(73) Assignees: TOYOTA JIDOSHA KABUSHIKI KAISHA, Toyota (JP); DENSO CORPORATION, Kariya (JP)

( * ) Notice: Subject to any disclaimer, the term of this patent is extended or adjusted under 35 U.S.C. 154(b) by 365 days.

(21) Appl. No.: 17/248,685

(22) Filed: Feb. 3, 2021

(65) Prior Publication Data
US 2021/0309072 A1     Oct. 7, 2021

(30) Foreign Application Priority Data

Apr. 1, 2020   (JP) ................. 2020-066139

(51) Int. Cl.
*B60H 1/00*      (2006.01)
(52) U.S. Cl.
CPC ..... *B60H 1/00657* (2013.01); *B60H 1/00899* (2013.01); *B60H 1/00971* (2013.01)
(58) Field of Classification Search
CPC ............ B60H 1/00971; B60H 1/00778; B60H 1/00657; B60H 1/00899
See application file for complete search history.

(56) References Cited

U.S. PATENT DOCUMENTS

| 2005/0204768 A1* | 9/2005 | Di Vito ................ F25B 9/008 62/324.1 |
| 2010/0293966 A1* | 11/2010 | Yokomachi ........ B60H 1/00478 62/271 |
| 2015/0102119 A1* | 4/2015 | Hirabayashi ....... B60H 1/00657 237/28 |

FOREIGN PATENT DOCUMENTS

| CN | 102774251 A | 11/2012 |
| CN | 107539061 A | 1/2018 |
| CN | 107745618 A | 3/2018 |
| JP | 08-230441 A | 9/1996 |

(Continued)

*Primary Examiner* — Sizo B Vilakazi
(74) *Attorney, Agent, or Firm* — Oblon, McClelland, Maier & Neustadt, L.L.P.

(57) ABSTRACT

A vehicle control device includes a controller configured to execute: receiving a remote signal containing a target temperature in a cabin and an expected traveling start time of a vehicle; performing preheating of the cabin in a second air-conditioning mode in which the preheating is performed by using an electric heat pump when a temperature in the cabin is predicted to be increasable to the target temperature in the second air-conditioning mode before the expected traveling start time, the preheating being based on a remote operation; and performing the preheating of the cabin in a first air-conditioning mode in which the preheating is performed by using exhaust heat generated when an internal combustion engine operates when the temperature in the cabin is predicted not to be increasable to the target temperature in the second air-conditioning mode before the expected traveling start time.

20 Claims, 7 Drawing Sheets

(56) References Cited

FOREIGN PATENT DOCUMENTS

| | | | |
|---|---|---|---|
| JP | 2006-290244 | A | 10/2006 |
| JP | 2014-084060 | A | 5/2014 |
| JP | 2015-077853 | A | 4/2015 |

* cited by examiner

VEHICLE CONTROL DEVICE, VEHICLE CONTROL METHOD, NON-TRANSITORY STORAGE MEDIUM AND VEHICLE CONTROL SYSTEM

CROSS-REFERENCE TO RELATED APPLICATION

This application claims priority to Japanese Patent Application No. 2020-066139 filed on Apr. 1, 2020, incorporated herein by reference in its entirety.

BACKGROUND

1. Technical Field

The present disclosure relates to a vehicle control device, a vehicle control method, and a vehicle control system.

2. Description of Related Art

Among air conditioners to be mounted on vehicles such as automobiles, a technology of preheating a cabin of the vehicle by activating a heating function of the air conditioner through a remote operation is becoming widespread. As a related technology for the preheating, there is a technology involving a combination of first air conditioning using exhaust heat from an internal combustion engine, and second air conditioning using an electric heat pump (see, for example, Japanese Unexamined Patent Application Publication No. 2015-077853 (JP 2015-077853 A)).

SUMMARY

The present disclosure provides a technology in which a vehicle to be preheated in its cabin through a remote operation can achieve a balance between environmental performance of the vehicle and user's comfort.

A vehicle control device according to a first aspect of the present disclosure includes a controller configured to execute: receiving a remote signal containing a target temperature in a cabin and an expected traveling start time of a vehicle from a remote controller used by a user of the vehicle; performing preheating of the cabin in a second air-conditioning mode when a temperature in the cabin is predicted to be increasable to the target temperature in the second air-conditioning mode before the expected traveling start time, the second air-conditioning mode being an air-conditioning mode in which the preheating is performed by using an electric heat pump, the preheating being based on a remote operation; and performing the preheating of the cabin in a first air-conditioning mode when the temperature in the cabin is predicted not to be increasable to the target temperature in the second air-conditioning mode before the expected traveling start time, the first air-conditioning mode being an air-conditioning mode in which the preheating is performed by using exhaust heat generated when an internal combustion engine operates.

A vehicle control method according to a second aspect of the present disclosure includes: receiving, by a computer, a remote signal containing a target temperature in a cabin and an expected traveling start time of a vehicle from a remote controller used by a user of the vehicle; performing, by the computer, preheating of the cabin in a second air-conditioning mode when a temperature in the cabin is predicted to be increasable to the target temperature in the second air-conditioning mode before the expected traveling start time, the second air-conditioning mode being an air-conditioning mode in which the preheating is performed by using an electric heat pump, the preheating being based on a remote operation; and performing, by the computer, the preheating of the cabin in a first air-conditioning mode when the temperature in the cabin is predicted not to be increasable to the target temperature in the second air-conditioning mode before the expected traveling start time, the first air-conditioning mode being an air-conditioning mode in which the preheating is performed by using exhaust heat generated when an internal combustion engine operates.

A non-transitory storage medium according to a third aspect of the present disclosure stores instructions that are executable by a computer and that cause the computer to perform the vehicle control method of the second aspect.

A vehicle control system according to a fourth aspect of the present disclosure includes: a remote controller to be used by a user of a vehicle, the remote controller being configured to, when a preheating request containing a target temperature in a cabin and an expected traveling start time of the vehicle is received, transmit a remote signal containing the target temperature and the expected traveling start time; and a control device configured to, when the control device receives the remote signal from the remote controller, perform preheating of the cabin based on the target temperature and the expected traveling start time, the control device including a controller configured to, when the remote signal is received: perform the preheating in a second air-conditioning mode when a temperature in the cabin is predicted to be increasable to the target temperature in the second air-conditioning mode before the expected traveling start time, the second air-conditioning mode being an air-conditioning mode in which the preheating is performed by using an electric heat pump; and perform the preheating in a first air-conditioning mode when the temperature in the cabin is predicted not to be increasable to the target temperature in the second air-conditioning mode before the expected traveling start time, the first air-conditioning mode being an air-conditioning mode in which the preheating is performed by using exhaust heat generated when an internal combustion engine operates.

According to the present disclosure, it is possible to provide the technology in which the vehicle to be preheated in its cabin through a remote operation can achieve the balance between the environmental performance of the vehicle and the user's comfort.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein.

DETAILED DESCRIPTION OF EMBODIMENTS

An embodiment disclosed herein is directed to an example in which a vehicle control device according to the present disclosure is applied to a vehicle control system. The vehicle control system in this example performs preheating of a cabin through a remote operation in a first air-conditioning mode using exhaust heat generated when an internal combustion engine operates, or in a second air-conditioning mode using an electric heat pump. A vehicle to which the control system is applied includes, as a prime mover, an internal combustion engine or a hybrid mechanism having an internal combustion engine and an electric motor.

In the vehicle control system in this example, a remote controller used by a user receives a preheating request from the user. The "preheating" is heating of the cabin in advance before the vehicle starts traveling (for example, before the user rides in the vehicle). The preheating request in this example contains information specifying a target temperature in the cabin, and information specifying an expected traveling start time of the vehicle. When the remote controller receives the preheating request, the remote controller transmits a remote signal to the control device mounted on the vehicle. In this case, the remote signal contains pieces of information indicating the target temperature and the expected traveling start time.

When the vehicle control device receives the remote signal, a controller predicts whether a temperature in the cabin is increasable to the target temperature in the second air-conditioning mode before the expected traveling start time. At this time, the controller may predict whether the temperature in the cabin is increasable to the target temperature in the second air-conditioning mode before the expected traveling start time based on at least one of an outside air temperature, a time margin, and a remaining battery charge level. The "outside air temperature" is a temperature of outside air at the time of reception of the remote signal. The "time margin" is a period from the time of reception of the remote signal to the expected traveling start time. The "remaining battery charge level" is a remaining charge level of a battery configured to supply electric power to the heat pump.

For example, the controller may perform the prediction by comparing the outside air temperature to a predetermined lower limit value. When the outside air temperature is equal to or higher than the lower limit value, the controller may predict that the temperature in the cabin is increasable to the target temperature in the second air-conditioning mode before the expected traveling start time. When the outside air temperature is lower than the lower limit value, the controller may predict that the temperature in the cabin is not increasable to the target temperature in the second air-conditioning mode before the expected traveling start time. The "lower limit value" is a temperature at which the heat pump cannot presumably operate properly when the outside air temperature is lower than the lower limit value. For example, the lower limit value is preset based on results of experiment or simulation.

The controller may perform the prediction by comparing a period required to increase the temperature in the cabin to the target temperature in the second air-conditioning mode (may hereinafter be referred to as "preheating period") to the time margin. When the preheating period is equal to or shorter than the time margin, the controller may predict that the temperature in the cabin is increasable to the target temperature in the second air-conditioning mode before the expected traveling start time. When the preheating period is longer than the time margin, the controller may predict that the temperature in the cabin is not increasable to the target temperature in the second air-conditioning mode before the expected traveling start time.

The controller may perform the prediction by comparing a consumption of the battery that is required to increase the temperature in the cabin to the target temperature in the second air-conditioning mode (may hereinafter be referred to as "preheating power consumption") to the remaining battery charge level. When the preheating power consumption is equal to or lower than the remaining battery charge level, the controller may predict that the temperature in the cabin is increasable to the target temperature in the second air-conditioning mode before the expected traveling start time. When the preheating power consumption is higher than the remaining battery charge level, the controller may predict that the temperature in the cabin is not increasable to the target temperature in the second air-conditioning mode before the expected traveling start time. The "remaining battery charge level" is a remaining amount of electric power in the battery that can be consumed for the preheating. If the vehicle is a plug-in hybrid vehicle, the remaining battery charge level may be excluded from consideration because the preheating can be performed in the second air-conditioning mode by using electric power supplied from an external power supply.

When it is predicted by the various methods described above that the temperature in the cabin is increasable to the target temperature in the second air-conditioning mode before the expected traveling start time, the controller performs the preheating in the second air-conditioning mode. When it is predicted that the temperature in the cabin is not increasable to the target temperature in the second air-conditioning mode before the expected traveling start time, the controller performs the preheating in the first air-conditioning mode. That is, the controller causes the internal combustion engine to release heat by starting the internal combustion engine, and heats the cabin by using the released heat.

Through the preheating described above, the temperature in the cabin can be increased to the target temperature before the expected traveling start time while suppressing the start of the internal combustion engine to the extent possible. Thus, user's comfort can be increased while minimizing a decrease in environmental performance along with the start of the internal combustion engine.

When it is predicted that the temperature in the cabin is not increasable to the target temperature in the second air-conditioning mode before the expected traveling start time, the preheating may be performed in the first air-conditioning mode with the consent of the user. For example, when it is predicted that the temperature in the cabin is not increasable to the target temperature in the second air-conditioning mode before the expected traveling start time, the controller may transmit, to the remote controller, a signal for prompting the user to select whether to permit execution of the preheating in the first air-conditioning mode (may hereinafter be referred to as "selection request signal"). When a signal for permitting execution of the preheating in the first air-conditioning mode is received from the remote controller, the controller may perform the preheating in the first air-conditioning mode. Thus, the start of the internal combustion engine against the user's intention, that is, consumption of fuel against the user's intention is suppressed.

When a signal for rejecting execution of the preheating in the first air-conditioning mode is received from the remote controller, the controller may calculate a reachable temperature, which is a temperature in the cabin that is predicted to reach in the second air-conditioning mode before the expected traveling start time. The controller may transmit, to the remote controller, a signal for prompting the user to change the target temperature to the reachable temperature (may hereinafter be referred to as "change request signal"). When a signal for permitting change of the target temperature to the reachable temperature is received from the remote controller, the controller may perform the preheating in the second air-conditioning mode. Thus, the temperature in the cabin can be increased to the extent possible while suppressing the start of the internal combustion engine against the user's intention.

EMBODIMENT

A more specific embodiment relating to the vehicle control system is described below with reference to the drawings.

Overview of System

Figure 1:
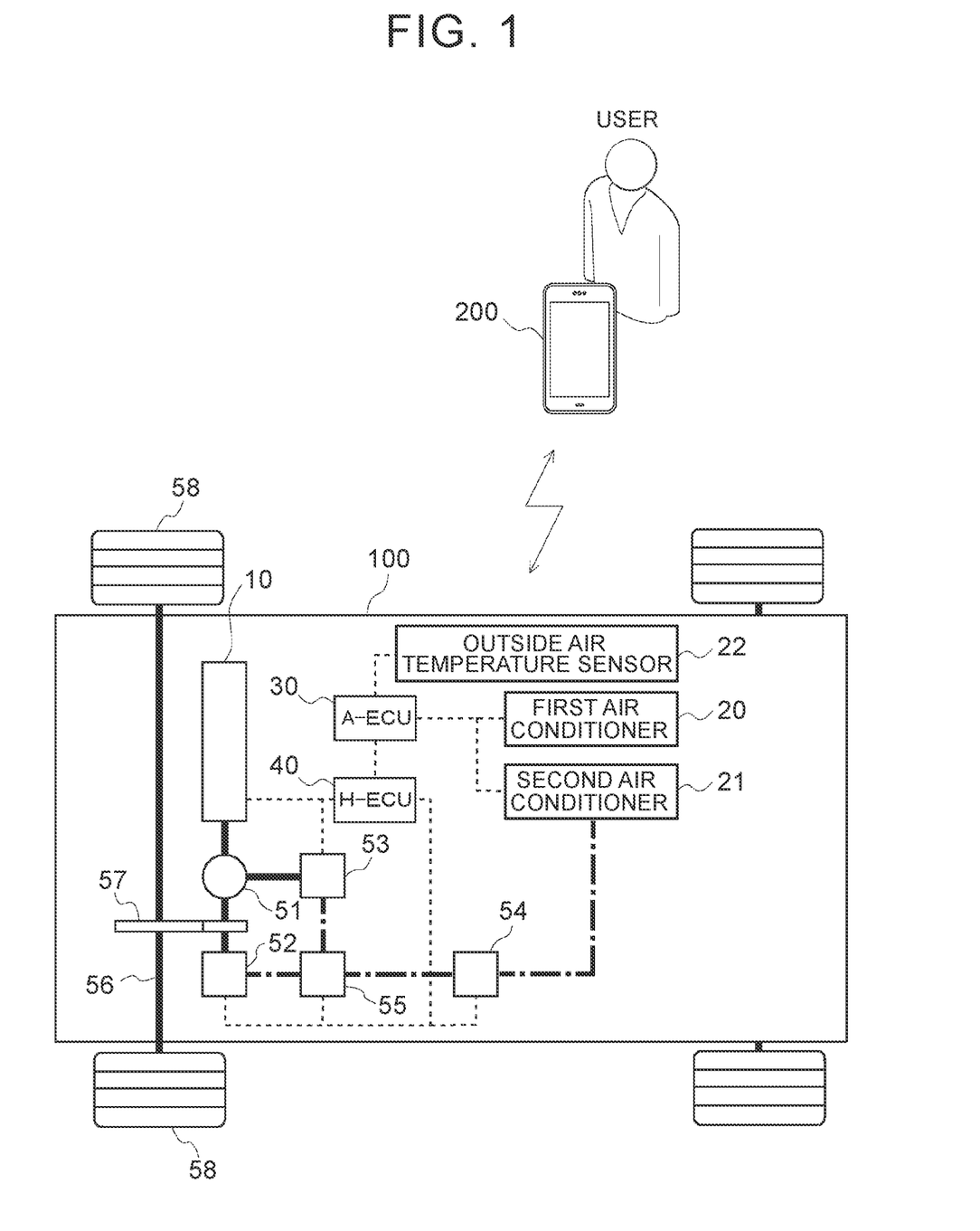
FIG. 1 is a diagram illustrating the overall configuration of a vehicle control system according to an embodiment.

FIG. 1 is a diagram illustrating the overall configuration of the vehicle control system according to this embodiment. As illustrated in FIG. 1, the control system in this example includes a vehicle 100 and a remote controller 200. The vehicle 100 in this example is a hybrid vehicle (HV) whose driving wheels 58 are driven to rotate in cooperation between an internal combustion engine 10 and an electric motor 52. Air conditioners 20 and 21 are mounted on the vehicle 100 to heat its cabin. The remote controller 200 is a device for remotely controlling air conditioning of the vehicle 100, and is used by a user of the vehicle 100. In this control system, the user operates the remote controller 200 before riding in the vehicle 100 to heat (preheat) the cabin by the air conditioners 20 and 21. Thus, the temperature in the cabin can be increased to a comfort temperature before the user rides in the vehicle 100.

Configuration of Vehicle 100

Next, a specific configuration of the vehicle 100 according to this embodiment is described. As illustrated in FIG. 1, the vehicle 100 includes a hybrid system configured to drive the driving wheels 58 of the vehicle 100 to rotate. The hybrid system includes the internal combustion engine 10, a power split device 51, the electric motor 52, a generator 53, a battery 54, a power control unit (PCU) 55, an axle (drive shaft) 56, and a speed reducer 57.

The internal combustion engine 10 is a spark-ignition internal combustion engine (gasoline engine) or a compression-ignition internal combustion engine (diesel engine) having at least one cylinder. An output shaft (crankshaft) of the internal combustion engine 10 is coupled to a rotational shaft of the generator 53 and a rotational shaft of the electric motor 52 via the power split device 51.

As described above, the rotational shaft of the generator 53 is coupled to the crankshaft of the internal combustion engine 10 via the power split device 51, and mainly generates electric power by using kinetic energy of the crankshaft. The generator 53 may also function as a starter motor by driving the crankshaft to rotate via the power split device 51 to start the internal combustion engine 10. The electric power generated by the generator 53 is stored in the battery 54 or supplied to the electric motor 52 via the PCU 55.

The rotational shaft of the electric motor 52 is coupled to the axle 56 via the speed reducer 57, and drives the driving wheels 58 to rotate by using electric power supplied from the battery 54 or the generator 53 via the PCU 55. The rotational shaft of the electric motor 52 is also coupled to the power split device 51, and may drive the driving wheels 58 to rotate by assisting the internal combustion engine 10.

For example, the power split device 51 is composed of a planetary gear set, and splits power among the internal combustion engine 10, the electric motor 52, and the generator 53. For example, the power split device 51 operates the electric motor 52 by adjusting the amount of electric power to be generated by the generator 53 while operating the internal combustion engine 10 in a most efficient operation range, thereby adjusting the traveling speed of the vehicle 100.

The PCU 55 includes an inverter, a boost converter, and a direct current-to-direct current (DC/DC) converter. The PCU 55 converts DC power supplied from the battery 54 into alternating current (AC) power, and supplies the AC power to the electric motor 52. The PCU 55 converts AC power supplied from the generator 53 into DC power, and supplies the DC power to the battery 54. The PCU 55 transforms the voltage of electric power to be exchanged between the inverter and the battery 54, or transforms the voltage of electric power to be supplied from the battery 54 to the second air conditioner 21 described later.

The first air conditioner 20 and the second air conditioner 21 are mounted on the vehicle 100 in this example. The first air conditioner 20 is a device configured to heat the cabin by using heat released from the internal combustion engine 10 (exhaust heat) when the internal combustion engine 10 operates. The second air conditioner 21 is a device configured to heat the cabin by using an electric heat pump.

Figure 2:
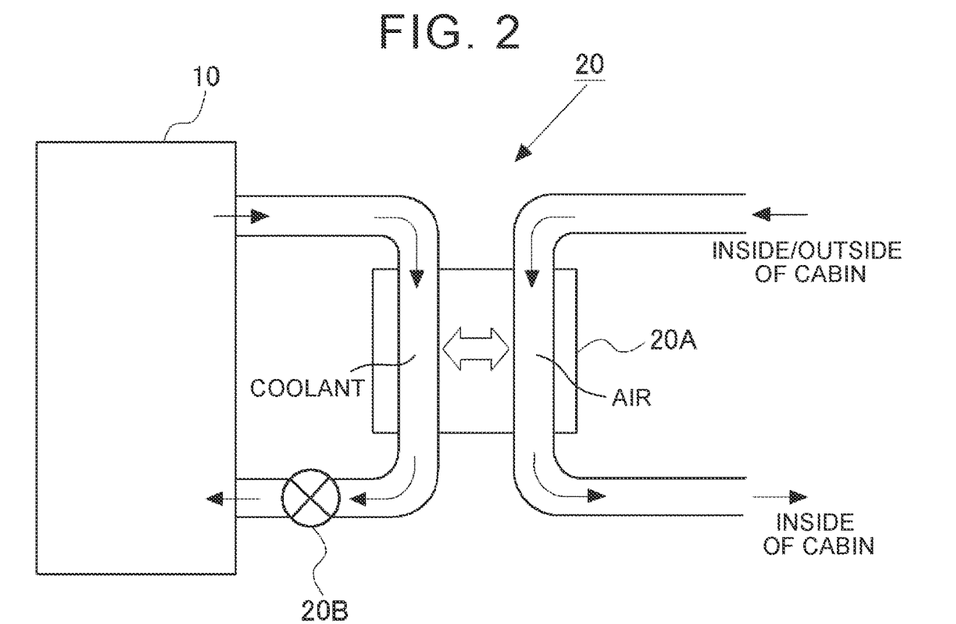
FIG. 2 is a diagram illustrating the structure of a first air conditioner.

For example, the first air conditioner 20 includes a first heat exchanger 20A and an on-off valve 20B as illustrated in FIG. 2. The first heat exchanger 20A exchanges heat between heating air and a coolant circulating through the internal combustion engine 10. In this example, the first heat exchanger 20A transfers heat to the heating air from the coolant that absorbs heat radiated from the internal combustion engine 10. The on-off valve 20B interrupts or passes a flow of the coolant from the internal combustion engine 10 to the first heat exchanger 20A. The on-off valve 20B is opened when the heating by the first air conditioner 20 is needed, and is closed when the heating by the first air conditioner 20 is not needed.

Figure 3:
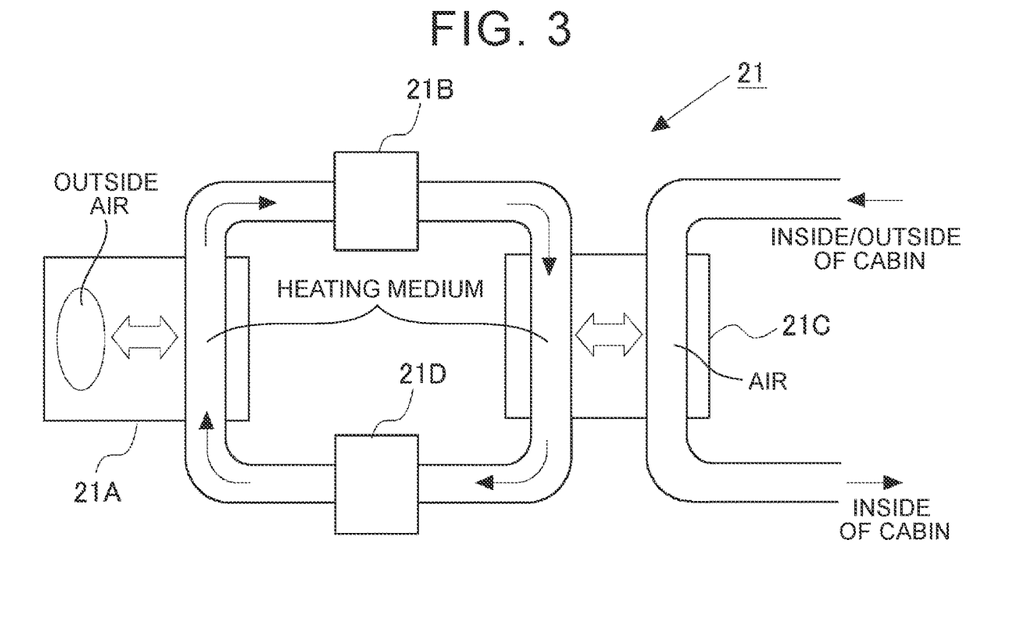
FIG. 3 is a diagram illustrating the structure of a second air conditioner.

For example, the second air conditioner 21 includes a second heat exchanger 21A, a compressor 21B, a third heat exchanger 21C, and an expansion valve 21D as illustrated in FIG. 3. The second heat exchanger 21A exchanges heat between outside air and a heating medium. In this example, the second heat exchanger 21A transfers heat in the outside air to the heating medium. The compressor 21B increases the amount of heat in the heating medium by compressing the heating medium that absorbs the heat in the outside air.

The compressor 21B is driven by an electric motor using the battery 54 as a power supply. The third heat exchanger 21C exchanges heat between heating air and the heating medium compressed by the compressor 21B. In this example, the third heat exchanger 21C transfers heat from the heating medium to the heating air. The expansion valve 21D brings the heating medium into a low-temperature and low-pressure state by expanding the heating medium. The heating medium brought into the low-temperature and low-pressure state by the expansion valve 21D can absorb the heat in the outside air at the second heat exchanger 21A because the temperature of the heating medium is lower than the temperature of the outside air. The heating medium circulates when the heating by the second air conditioner 21 is needed, and does not circulate when the heating by the second air conditioner 21 is not needed.

At least one of the first air conditioner 20 and the second air conditioner 21 may further have a function of cooling the cabin. An air conditioner having the function of cooling the cabin may be mounted on the vehicle 100 in addition to the air conditioners 20 and 21.

The vehicle 100 having the configuration described above includes an electronic control unit (ECU) 30 configured to control the air conditioners 20 and 21, and an ECU 40 configured to control the hybrid system. The ECU 30 configured to control the air conditioners 20 and 21 is hereinafter referred to as "A-ECU 30". The ECU 40 configured to control the hybrid system is hereinafter referred to as "hybrid electronic control unit (H-ECU) 40".

For example, the H-ECU 40 controls the internal combustion engine 10, the electric motor 52, the generator 53, and the PCU 55 in response to a user's driving operation and/or based on detection signals from various sensors mounted on the vehicle 100. The H-ECU 40 may be divided into an ECU configured to control the overall hybrid system, and an ECU configured to control the internal combustion engine 10.

The A-ECU 30 controls the air conditioners 20 and 21 in response to an operation on, for example, an operation panel provided in the cabin, or a remote signal from the remote controller 200. An outside air temperature sensor 22 is connected to the A-ECU 30 to measure a temperature of outside air. The outside air temperature measured by the outside air temperature sensor 22 is input to the A-ECU 30.

Hardware Configurations of A-ECU and Remote Controller

Figure 4:
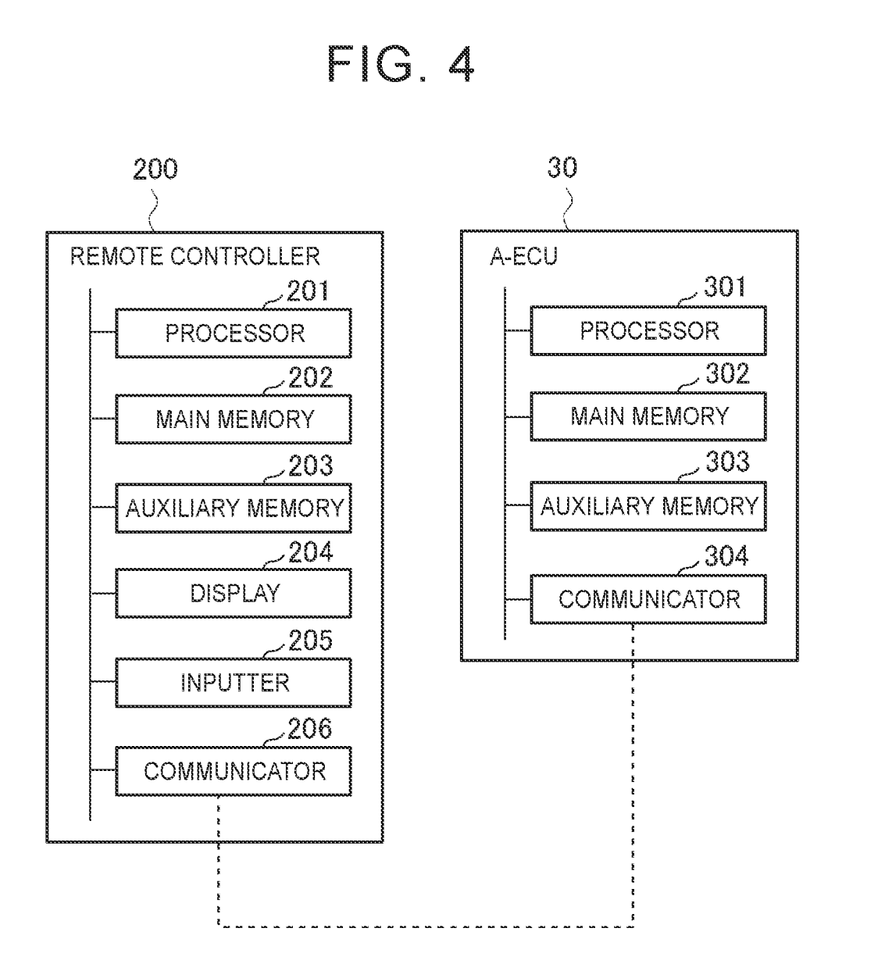
FIG. 4 is a diagram illustrating the hardware configurations of an air-conditioner electronic control unit (A-ECU) and a remote controller.

The hardware configurations of the A-ECU 30 and the remote controller 200 are described with reference to FIG. 4.

The A-ECU 30 includes a processor 301, a main memory 302, an auxiliary memory 303, and a communicator 304. Those components are connected together by a bus. The main memory 302 and the auxiliary memory 303 are computer-readable recording media. The hardware configuration of the A-ECU 30 is not limited to the configuration in the example illustrated in FIG. 4, and any component may be omitted, replaced, or added as appropriate. The A-ECU 30 implements functions suited to predetermined purposes such that the processor 301 executes programs stored in the recording medium by loading the programs on a working area of the main memory 302 and functional units are controlled through the execution of the programs.

Examples of the processor 301 include a central processing unit (CPU) and a digital signal processor (DSP). The processor 301 controls the A-ECU 30, and performs calculations in various information processes. For example, the main memory 302 includes a random access memory (RAM) and a read only memory (ROM). Examples of the auxiliary memory 303 include an erasable programmable ROM (EPROM) and a hard disk drive (HDD). The auxiliary memory 303 may include a removable medium, that is, a portable recording medium. Examples of the removable medium include a universal serial bus (USB) memory, a compact disc (CD), and a digital versatile disc (DVD).

The auxiliary memory 303 stores various programs, various types of data, and various tables in the recording medium in a readable and writable manner. The auxiliary memory 303 also stores an operating system (OS). Those pieces of information may partially or entirely be stored in the main memory 302. Information stored in the main memory 302 may be stored in the auxiliary memory 303.

The communicator 304 transmits and receives information between external devices and the A-ECU 30. Examples of the communicator 304 include a wireless communication circuit for wireless communication. For example, the wireless communication circuit performs data communication with the remote controller 200 in conformity with Bluetooth (registered trademark) Low Energy (hereinafter referred to as "BLE"). The wireless communication circuit may be configured to perform wireless communication with the remote controller 200 by using, for example, near field communication (NFC), ultra-wideband (UWB), or Wi-Fi (registered trademark). The wireless communication circuit may be configured to be connected to a network by using a mobile communication service such as 5th Generation (5G) or Long Term Evolution (LTE). In this case, the network is a wide area network (WAN) such as the Internet that is a worldwide public communication network, or a telephone communication network for mobile phones or the like.

A series of processes to be executed by the A-ECU 30 having the configuration described above may be executed by hardware or software.

The remote controller 200 is a small computer that can be carried by the user, such as a smart key or other electronic keys (portable devices), a smartphone, a mobile phone, a tablet terminal, a personal information terminal, or a wearable computer (such as a smart watch). The remote controller 200 may be a personal computer (PC) connected to the A-ECU 30 via a network such as the Internet that is a public communication network.

The remote controller 200 includes a processor 201, a main memory 202, an auxiliary memory 203, a display 204, an inputter 205, and a communicator 206. The processor 201, the main memory 202, and the auxiliary memory 203 are similar to the processor 301, the main memory 302, and the auxiliary memory 303 of the A-ECU 30, and their description is therefore omitted. Examples of the display 204 include a liquid crystal display (LCD) and an electroluminescence (EL) panel. Examples of the inputter 205 include a touch panel or a push-button to be used for inputting characters or other codes, a microphone to be used for inputting voice, and a camera configured to capture moving or static images. Examples of the communicator 206 include a communication circuit configured to access a network by using a mobile communication service to perform data communication with the A-ECU 30. The communicator 206 may be configured to communicate with the A-ECU 30 in conformity with the same short-range communication standard as that of the communicator 304 of the A-ECU 30.

A series of processes to be executed by the remote controller 200 having the configuration described above may be executed by hardware or software.

Functional Configuration of A-ECU

Figure 5:
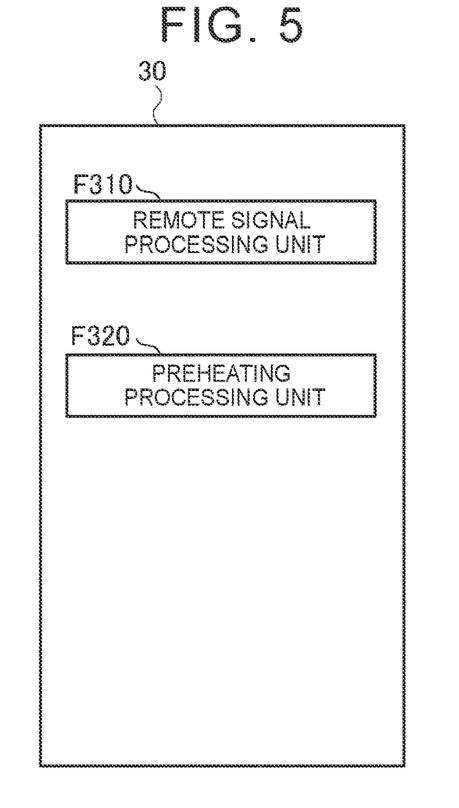
FIG. 5 is a block diagram illustrating the functional configuration of the A-ECU.

Next, the functional configuration of the A-ECU 30 is described with reference to FIG. 5. As illustrated in FIG. 5, the A-ECU 30 in this example includes a remote signal processing unit F310 and a preheating processing unit F320 as its functional elements. The remote signal processing unit F310 and the preheating processing unit F320 are implemented such that the processor 301 of the A-ECU 30 executes computer programs on the main memory 302. Any one of the remote signal processing unit F310 and the preheating processing unit F320 or a part of the remote signal processing unit F310 and the preheating processing unit F320 may be implemented by a hardware circuit.

When the communicator 304 receives a remote signal transmitted from the remote controller 200, the remote signal processing unit F310 predicts whether preheating is executable in a second air-conditioning mode (mode in which the second air conditioner 21 heats the cabin). The "remote signal" contains a target temperature in the cabin and an expected traveling start time of the vehicle 100.

The remote signal processing unit F310 performs the prediction based on an outside air temperature at the time of reception of the remote signal (value measured by the outside air temperature sensor 22), a time margin from the time of reception of the remote signal to the expected traveling start time, and a remaining charge level of the battery 54. That is, the remote signal processing unit F310 performs the prediction based on whether the following conditions (1) to (3) are satisfied. (1) The outside air temperature at the time of reception of the remote signal is equal to or higher than a predetermined lower limit value. (2) A preheating period is equal to or shorter than the time margin. (3) A preheating power consumption is equal to or lower than the remaining battery charge level. The "remaining battery charge level" is a remaining amount of electric power in the battery 54 that does not presumably affect operations of other devices even though the electric power is consumed for preheating. The "lower limit value" is a temperature at which the second air conditioner 21 cannot presumably operate properly when the outside air temperature is lower than the lower limit value. For example, the lower limit value is a temperature at which the second heat exchanger 21A of the second air conditioner 21 cannot presumably transfer heat efficiently from outside air to the heating medium when the outside air temperature is lower than the lower limit value. The "preheating period" is a period required to increase the temperature in the cabin to the target temperature through the preheating in the second air-conditioning mode. The "preheating power consumption" is a consumption of the battery 54 that is required to increase the temperature in the cabin to the target temperature through the preheating in the second air-conditioning mode.

When all the conditions (1) to (3) are satisfied, it is estimated that the temperature in the cabin is increasable to the target temperature before the expected traveling start time by executing the preheating in the second air-conditioning mode.

Therefore, the remote signal processing unit F310 predicts that the preheating is executable in the second air-conditioning mode. When at least one of the conditions (1) to (3) is not satisfied, it is estimated that the temperature in the cabin is not increasable to the target temperature before the expected traveling start time even if the preheating is executed in the second air-conditioning mode. Therefore, the remote signal processing unit F310 predicts that the preheating is not executable in the second air-conditioning mode. If the vehicle 100 is a plug-in hybrid vehicle (PHV), the condition (3) may be excluded from consideration because the second air conditioner 21 can be operated by using an external power supply.

When determination is made that the preheating is executable in the second air-conditioning mode, an instruction to execute the preheating in the second air-conditioning mode (may hereinafter be referred to as "second execution instruction") is sent from the remote signal processing unit F310 to the preheating processing unit F320. The second execution instruction contains the target temperature and the expected traveling start time specified in the remote signal.

When determination is made that the preheating is not executable in the second air-conditioning mode, the remote signal processing unit F310 transmits a selection request signal to the remote controller 200 via the communicator 304. The "selection request signal" prompts the user of the vehicle 100 to select whether to permit execution of the preheating in a first air-conditioning mode (mode in which the first air conditioner 20 heats the cabin).

When a signal for permitting execution of the preheating in the first air-conditioning mode is returned from the remote controller 200 in response to the selection request signal, the signal is sent to the remote signal processing unit F310 via the communicator 304. In this case, the remote signal processing unit F310 sends an instruction to execute the preheating in the first air-conditioning mode (may hereinafter be referred to as "first execution instruction") to the preheating processing unit F320. The first execution instruction contains the target temperature and the expected traveling start time specified in the remote signal.

Figure 6:
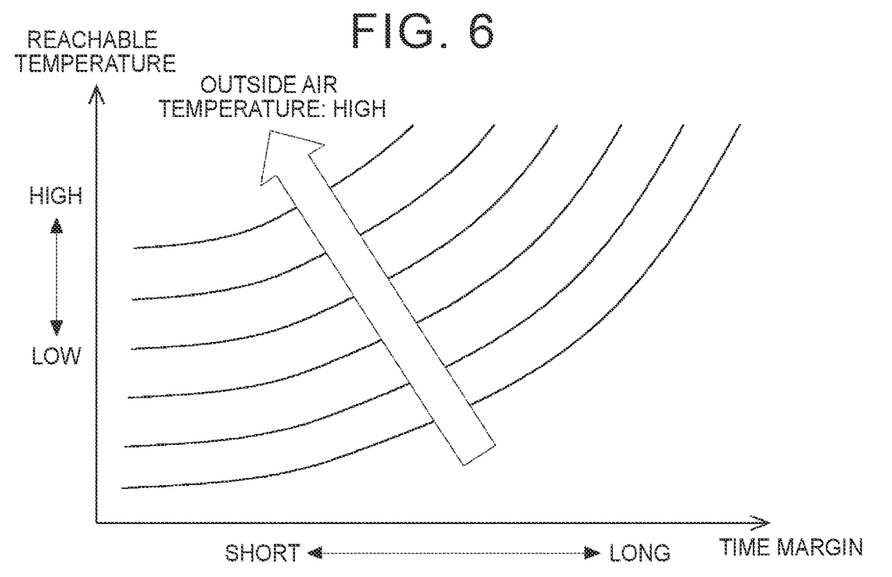
FIG. 6 is a diagram illustrating a correlation among a time margin, an outside air temperature, and a reachable temperature.
Figure 7:
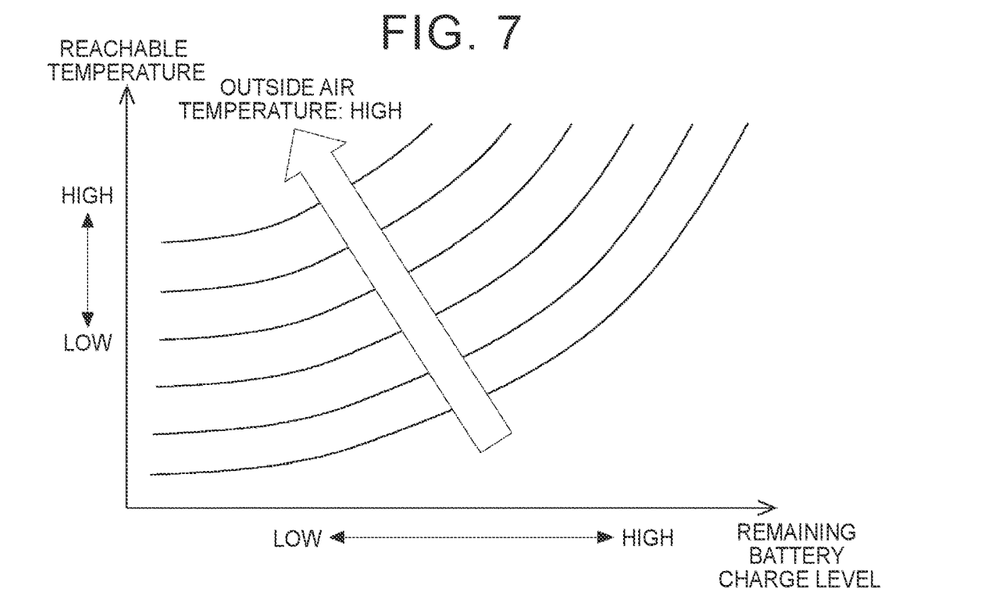
FIG. 7 is a diagram illustrating a correlation among a remaining battery charge level, the outside air temperature, and the reachable temperature.

When a signal for rejecting execution of the preheating in the first air-conditioning mode is returned from the remote controller 200, the remote signal processing unit F310 transmits a change request signal to the remote controller 200 via the communicator 304. The "change request signal" prompts the user of the vehicle 100 to make a selection as to whether the target temperature can be changed to a reachable temperature. The "reachable temperature" is a temperature in the cabin that is predicted to reach before the expected traveling start time by executing the preheating in the second air-conditioning mode. The reachable temperature is calculated based on the outside air temperature at the time of reception of the remote signal, the time margin, and the remaining battery charge level. When the remaining battery charge level is equal to or higher than the preheating power consumption, the remote signal processing unit F310 calculates the reachable temperature based on a correlation illustrated in FIG. 6. FIG. 6 is a diagram illustrating a correlation among the outside air temperature when the A-ECU 30 receives the remote signal, the time margin, and the reachable temperature. As illustrated in FIG. 6, the reachable temperature is calculated as a higher temperature as the time margin increases and as the outside air temperature increases. When the remaining battery charge level is lower than the preheating power consumption, the remote signal processing unit F310 calculates the reachable temperature based on a correlation illustrated in FIG. 7. FIG. 7 is a diagram illustrating a correlation among the outside air temperature when the A-ECU 30 receives the remote signal, the remaining battery charge level, and the reachable temperature. As illustrated in FIG. 7, the reachable temperature is calculated as a higher temperature as the remaining battery charge level increases and as the outside air temperature increases.

When a signal for permitting change of the target temperature to the reachable temperature is returned from the remote controller 200 in response to the change request signal, the signal is sent to the remote signal processing unit F310 via the communicator 304. In this case, the remote signal processing unit F310 sends, to the preheating processing unit F320, a second execution instruction containing the changed target temperature (temperature substantially equal to the reachable temperature) and the expected traveling start time.

When a signal for rejecting change of the target temperature to the reachable temperature is returned from the remote controller 200, the remote signal processing unit F310 cancels execution of the preheating. When it is predicted that the preheating is not executable in the second air-conditioning mode because the condition (1) is not satisfied, execution of the preheating is canceled without transmitting the change request signal to the remote controller 200.

The preheating processing unit F320 performs preheating in response to the first execution instruction or the second execution instruction sent from the remote signal processing unit F310. When the preheating is performed in response to the second execution instruction, the preheating processing unit F320 calculates a preheating start time. The "preheating start time" is a time when the preheating is started in the second air-conditioning mode, and is determined through an inverse operation that involves subtracting the preheating period from the expected traveling start time. The preheating processing unit F320 starts the preheating in the second air-conditioning mode at the preheating start time. Specifically, the preheating processing unit F320 starts supplying electric power from the battery 54 to the compressor 21B at the preheating start time. Therefore, the second air conditioner 21 starts exchanging heat between outside air and the heating medium and between the heating medium and heating air, thereby heating the heating air. As a result, the temperature in the cabin can be increased to the target temperature before the expected traveling start time.

When the preheating is performed in response to the first execution instruction, the preheating processing unit F320 calculates a preheating start time through a procedure similar to that in the case where the preheating is performed in response to the second execution instruction. The preheating period for use in this calculation is a period required to increase the temperature in the cabin to the target temperature through the preheating in the first air-conditioning mode. This preheating period is derived based on a coolant temperature and an outside air temperature when the A-ECU 30 receives the remote signal. The preheating processing unit F320 starts the preheating in the first air-conditioning mode at the preheating start time. Specifically, the preheating processing unit F320 starts the internal combustion engine 10 via the H-ECU 40 at the preheating start time, and opens the on-off valve 20B. Therefore, the first air conditioner 20 starts exchanging heat between heating air and the coolant that absorbs heat radiated from the internal combustion engine 10, thereby heating the heating air. As a result, the temperature in the cabin can be increased to the target temperature before the expected traveling start time.

Functional Configuration of Remote Controller

Figure 8:
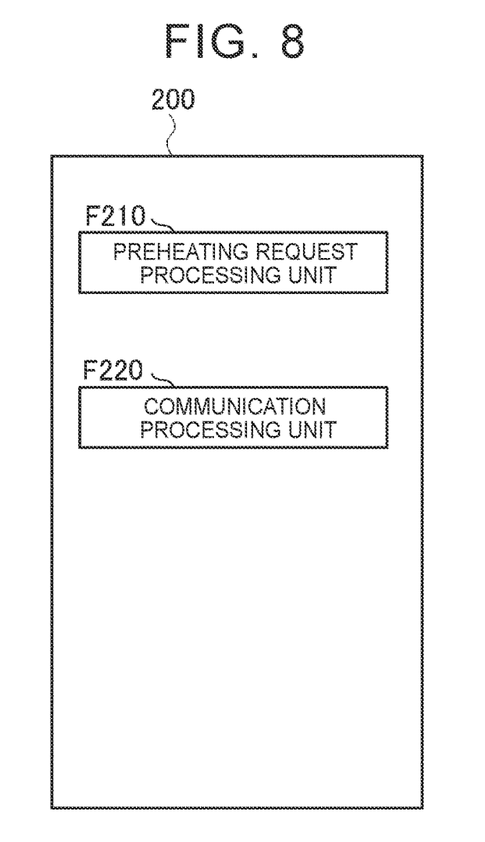
FIG. 8 is a block diagram illustrating the functional configuration of the remote controller.

Next, the functional configuration of the remote controller 200 is described with reference to FIG. 8. As illustrated in FIG. 8, the remote controller 200 in this example includes a preheating request processing unit F210 and a communication processing unit F220 as its functional elements. The preheating request processing unit F210 and the communication processing unit F220 are implemented such that the processor 201 of the remote controller 200 executes computer programs on the main memory 202. Any one of the preheating request processing unit F210 and the communication processing unit F220 or a part of the preheating request processing unit F210 and the communication processing unit F220 may be implemented by a hardware circuit.

When the user makes a preheating request operation on the remote controller 200, the preheating request processing unit F210 acquires a target temperature in the cabin and an expected traveling start time of the vehicle 100. For example, the preheating request processing unit F210 displays a setting screen for the target temperature and the expected traveling start time on the touch panel of the inputter 205, thereby prompting the user to set the target temperature and the expected traveling start time. The target temperature and the expected traveling start time acquired by the preheating request processing unit F210 are sent to the communication processing unit F220.

When the communicator 206 receives the selection request signal, the preheating request processing unit F210 performs a process of prompting the user of the vehicle 100 to select whether to permit execution of the preheating in the first air-conditioning mode. For example, the preheating request processing unit F210 may display buttons on the touch panel of the inputter 205 for selection as to whether to permit or reject execution of the preheating in the first air-conditioning mode. When the user makes a selection to permit or reject execution of the preheating in the first air-conditioning mode, the selection result is sent from the preheating request processing unit F210 to the communication processing unit F220.

When the communicator 206 receives the change request signal, the preheating request processing unit F210 performs a process of prompting the user of the vehicle 100 to make a selection as to whether the target temperature can be changed to the reachable temperature. For example, the preheating request processing unit F210 may display buttons on the touch panel of the inputter 205 for selection as to whether to permit or reject change of the target temperature to the reachable temperature. When the user makes a selection to permit or reject change of the target temperature to the reachable temperature, the selection result is sent from the preheating request processing unit F210 to the communication processing unit F220.

The communication processing unit F220 has a function of transmitting various signals to the A-ECU 30. For example, when the target temperature and the expected traveling start time are received from the preheating request processing unit F210, the communication processing unit F220 transmits a remote signal containing the target temperature and the expected traveling start time to the A-ECU 30 via the communicator 206. When the selection result responding to the selection request signal is received from the preheating request processing unit F210, the communication processing unit F220 transmits a signal indicating the selection result to the A-ECU 30 via the communicator 206. When the selection result responding to the change request signal is received from the preheating request processing unit F210, the communication processing unit F220 transmits a signal indicating the selection result to the A-ECU 30 via the communicator 206.

Process Flow

Figure 9:
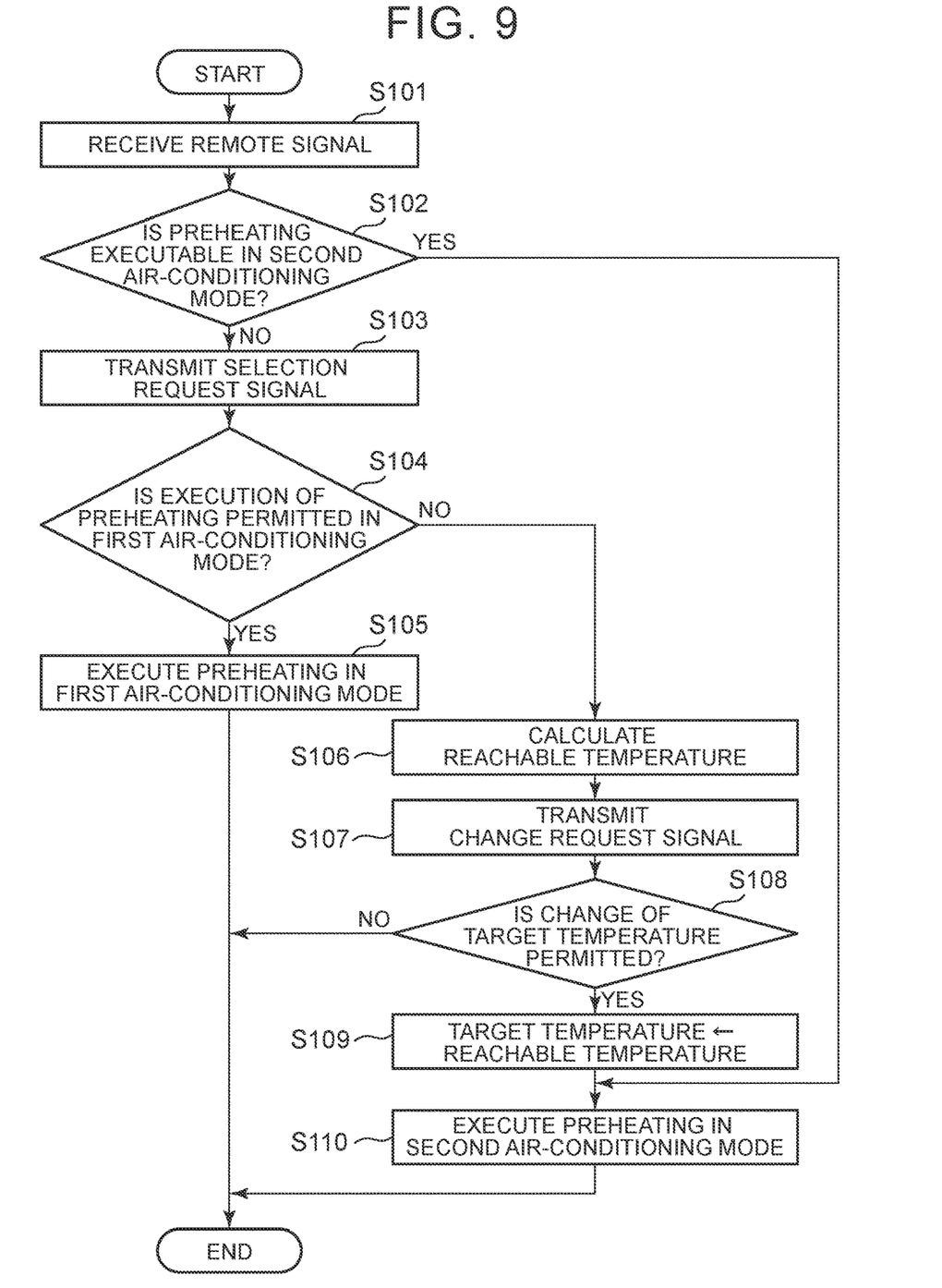
FIG. 9 is a flowchart illustrating a flow of a process to be performed by the A-ECU when a remote signal is received.

Next, a flow of a process to be performed by the A-ECU 30 according to this embodiment is described with reference to FIG. 9. FIG. 9 is a flowchart illustrating a flow of a process to be performed by the A-ECU 30 when a remote signal is received from the remote controller 200.

In FIG. 9, when the communicator 304 of the A-ECU 30 receives the remote signal from the remote controller 200 (Step S101), the remote signal processing unit F310 predicts whether preheating is executable in the second air-conditioning mode (Step S102). This prediction process is executed along a process flow illustrated in FIG. 10.

Figure 10:
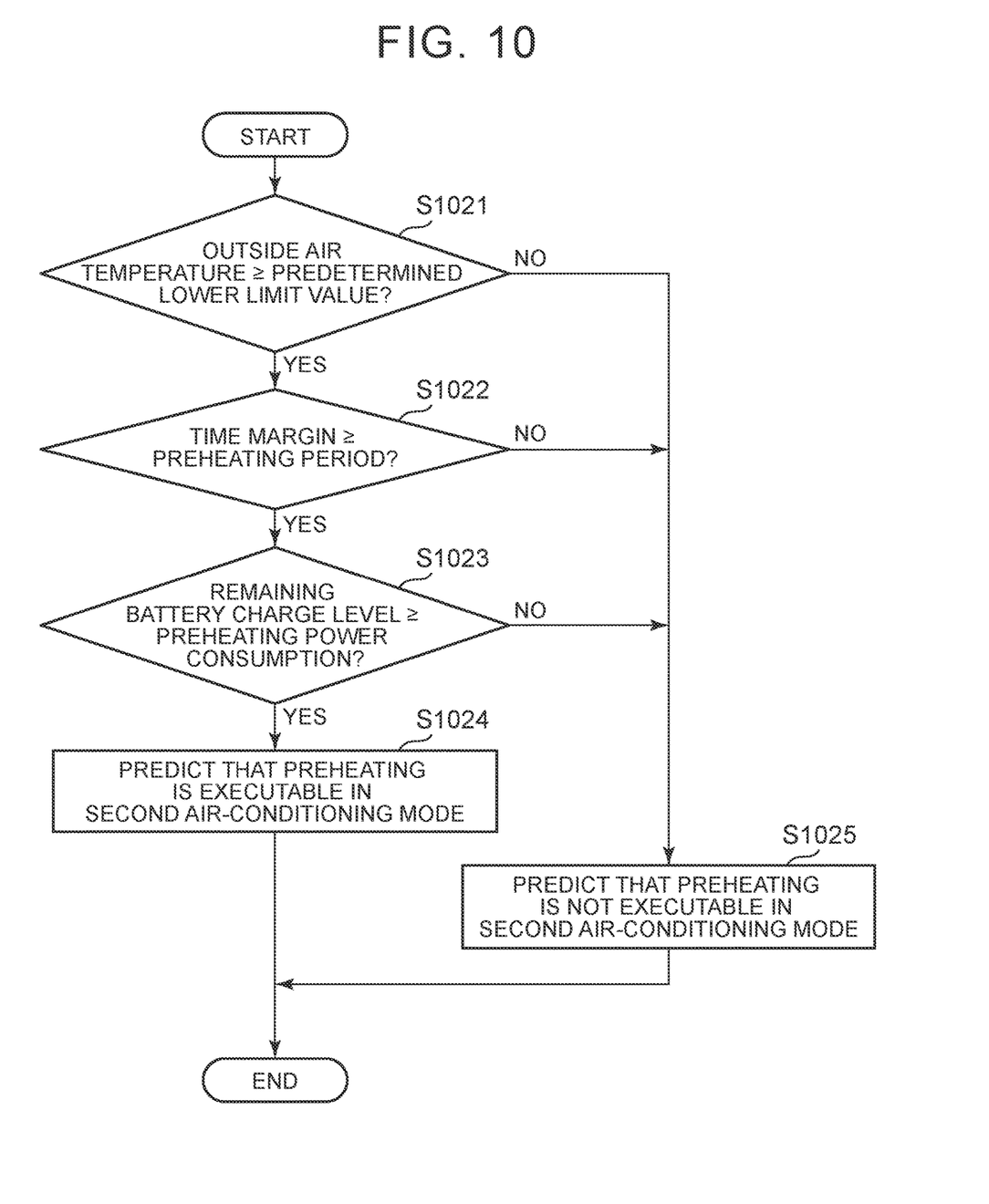
FIG. 10 is a flowchart illustrating a flow of a process to be performed by the A-ECU for prediction of whether preheating can be executed in a second air-conditioning mode.

In FIG. 10, the remote signal processing unit F310 reads an outside air temperature measured by the outside air temperature sensor 22, and determines whether the read outside air temperature is equal to or higher than the predetermined lower limit value (Step S1021). As described above, the lower limit value is a temperature at which the second air conditioner 21 cannot presumably operate properly when the outside air temperature is lower than the lower limit value. When the outside air temperature is lower than the lower limit value ("no" in Step S1021), the remote signal processing unit F310 predicts that the preheating is not executable in the second air-conditioning mode (Step S1025). When the outside air temperature is equal to or higher than the lower limit value ("yes" in Step S1021), the remote signal processing unit F310 executes a process of Step S1022.

In Step S1022, the remote signal processing unit F310 determines whether a time margin is equal to or longer than a preheating period. As described above, the time margin is a period from the time of reception of the remote signal to an expected traveling start time. As described above, the preheating period is a period required to increase the temperature in the cabin to a target temperature by executing the preheating in the second air-conditioning mode. The preheating period increases as a difference between the target temperature and the outside air temperature at the time of reception of the remote signal increases. When the time margin is shorter than the preheating period ("no" in Step S1022), the remote signal processing unit F310 proceeds to Step S1025, and predicts that the preheating is not executable in the second air-conditioning mode. When the time margin is equal to or longer than the preheating period ("yes" in Step S1022), the remote signal processing unit F310 executes a process of Step S1023.

In Step S1023, the remote signal processing unit F310 determines whether a remaining charge level of the battery 54 (remaining battery charge level) is equal to or higher than a preheating power consumption. As described above, the preheating power consumption is a consumption of the battery 54 that is required to increase the temperature in the cabin to the target temperature by executing the preheating in the second air-conditioning mode. When the remaining battery charge level is lower than the preheating power consumption ("no" in Step S1023), the remote signal processing unit F310 proceeds to Step S1025, and predicts that the preheating is not executable in the second air-conditioning mode. When the remaining battery charge level is equal to or higher than the preheating power consumption ("yes" in Step S1023), the remote signal processing unit F310 predicts that the preheating is executable in the second air-conditioning mode (Step S1024).

Referring back to FIG. 9, when the result of the determination in Step S102 is "yes" (it is predicted that the preheating is executable in the second air-conditioning mode), the remote signal processing unit F310 sends a second execution instruction to the preheating processing unit F320. In this case, the preheating processing unit F320 executes the preheating in the second air-conditioning mode based on the target temperature and the expected traveling start time contained in the second execution instruction (Step S110). Specifically, the preheating processing unit F320 calculates the preheating start time. The preheating processing unit F320 starts supplying electric power from the battery 54 to the compressor 21B at the preheating start time. Thus, the temperature in the cabin can be increased to the target temperature before the expected traveling start time without starting the internal combustion engine 10.

When the result of the determination in Step S102 is "no" (it is predicted that the preheating is not executable in the second air-conditioning mode), the remote signal processing unit F310 transmits a selection request signal to the remote controller 200 via the communicator 304. As described above, the selection request signal prompts the user to select whether to permit execution of the preheating in the first air-conditioning mode. When the communicator 206 of the remote controller 200 receives the selection request signal, the preheating request processing unit F210 performs the process of prompting the user of the vehicle 100 to select whether to permit execution of the preheating in the first air-conditioning mode. When the user makes a selection to permit or reject execution of the preheating in the first air-conditioning mode, the selection result is sent from the preheating request processing unit F210 to the communication processing unit F220. The communication processing unit F220 transmits a signal indicating the user's selection result to the A-ECU 30 via the communicator 206. That is, the communication processing unit F220 transmits a signal indicating whether to permit or reject execution of the preheating in the first air-conditioning mode to the A-ECU 30 via the communicator 206.

When the communicator 304 receives the signal returned from the remote controller 200 in response to the selection request signal, the remote signal processing unit F310 determines whether the signal is a signal for permitting execution of the preheating in the first air-conditioning mode (Step S104). When the signal is the signal for permitting execution of the preheating in the first air-conditioning mode ("yes" in Step S104), the remote signal processing unit F310 sends a first execution instruction to the preheating processing unit F320. In this case, the preheating processing unit F320 executes the preheating in the first air-conditioning mode based on the target temperature and the expected traveling start time contained in the first execution instruction (Step S105). Specifically, the preheating processing unit F320 first calculates a preheating start time. Then, the preheating processing unit F320 starts the internal combustion engine 10 via the H-ECU 40 at the preheating start time. Then, the preheating processing unit F320 opens the on-off valve 20B of the first air conditioner 20. Thus, the temperature in the cabin can be increased to the target temperature before the expected traveling start time though the internal combustion engine 10 is started.

When the result of the determination in Step S104 is "no", the remote signal processing unit F310 calculates a reachable temperature (Step S106). As described above, the reachable temperature is a temperature in the cabin that is predicted to reach before the expected traveling start time by executing the preheating in the second air-conditioning mode. The reachable temperature is calculated based on the correlation of FIG. 6 or FIG. 7.

In Step S107, the remote signal processing unit F310 transmits a change request signal to the remote controller 200 via the communicator 304 (Step S107). The change request signal prompts the user to make a selection as to whether the target temperature can be changed to the reachable temperature calculated in Step S106. When the communicator 206 of the remote controller 200 receives the change request signal, the preheating request processing unit F210 performs the process of prompting the user of the vehicle 100 to make a selection as to whether the target temperature can be changed to the reachable temperature. When the user makes a selection to permit or reject change of the target temperature to the reachable temperature, the selection result is sent from the preheating request processing unit F210 to the communication processing unit F220. The communication processing unit F220 transmits a signal indicating the user's selection result to the A-ECU 30 via the communicator 206. That is, the communication processing unit F220 transmits a signal indicating whether to permit or reject change of the target temperature to the reachable temperature to the A-ECU 30 via the communicator 206.

When the communicator 304 receives the signal returned from the remote controller 200 in response to the change request signal, the remote signal processing unit F310 determines whether the signal is a signal for permitting change of the target temperature to the reachable temperature (Step S108). When the signal is the signal for permitting change of the target temperature to the reachable temperature ("yes" in Step S108), the remote signal processing unit F310 changes the target temperature to the reachable temperature (Step S109). The remote signal processing unit F310 sends a second execution instruction containing the changed target temperature and the expected traveling start time to the preheating processing unit F320. In this case, the preheating processing unit F320 executes the preheating in the second air-conditioning mode based on the target temperature (=reachable temperature) and the expected traveling start time contained in the second execution instruction (Step S110). In this case, the cabin can be preheated without starting the internal combustion engine 10 though the temperature in the cabin that is increasable before the expected traveling start time is lower than the initial target temperature.

When the result of the determination in Step S108 is "no", the execution of this processing routine is terminated. In this case, neither the preheating in the first air-conditioning mode nor the preheating in the second air-conditioning mode is executed. This is intended for a user who does not want to preheat the cabin by starting the internal combustion engine 10.

According to the embodiment described above, the preheating in the second air-conditioning mode is executed with priority over the preheating in the first air-conditioning mode. Thus, the temperature in the cabin can be increased to the target temperature before the expected traveling start time while suppressing the start of the internal combustion engine 10 to the extent possible. When it is predicted that the preheating is not executable in the second air-conditioning mode, the user is prompted to select whether to permit execution of the preheating in the first air-conditioning mode. Thus, the start of the internal combustion engine 10 against the user's intention can be suppressed. When the user does not want execution of the preheating in the first air-conditioning mode, the preheating may be executed in the second air-conditioning mode while changing the target temperature from the initial target temperature. In this case, the temperature in the cabin can be increased to the extent possible while suppressing the start of the internal combustion engine 10 against the user's intention. According to this embodiment, it is possible to achieve a balance between environmental performance of the vehicle 100 and user's comfort.

In this embodiment, the HV is exemplified as the vehicle to which the present disclosure is applied, but the vehicle is not limited to the HV. For example, the vehicle to which the present disclosure is applied may be an electric vehicle (EV) including an internal combustion engine for electric power generation. The vehicle to which the present disclosure is applied may be a vehicle including only an internal combustion engine as a prime mover. In short, the vehicle to which the present disclosure is applied only needs to be a vehicle including a first air conditioner configured to heat a cabin by using exhaust heat from an internal combustion engine, and a second air conditioner configured to heat the cabin by using an electric heat pump.

Modified Example

The embodiment described above is directed to the example in which the user is prompted to select whether to permit execution of the first air-conditioning mode when it is predicted that the temperature in the cabin is not increasable to the target temperature in the second air-conditioning mode. When it is predicted that the temperature in the cabin is not increasable to the target temperature in the second air-conditioning mode, the preheating may automatically be executed in the first air-conditioning mode without prompting the user to select whether to permit execution of the first air-conditioning mode.

In this case, the temperature in the cabin can be increased to the target temperature more securely before the expected traveling start time while suppressing the start of the internal combustion engine 10 to the extent possible. Thus, the user's comfort can be increased while minimizing a decrease in the environmental performance along with the start of the internal combustion engine 10.

Others

The embodiment and the modified example described above are illustrative in all respects, and the present disclosure may be modified as appropriate without departing from the spirit of the present disclosure. For example, the embodiment and the modified example may be combined if possible.

The processes and means described in the present disclosure may freely be combined without causing any technical contradiction. The process described as being executed by a single device may be executed by a plurality of devices in cooperation. Alternatively, the process described as being executed by different devices may be executed by a single device. For example, a part of the process to be executed by the A-ECU may be executed by the remote controller. In the computer system, the hardware configuration that implements functions may be changed flexibly.

The present disclosure may be embodied such that a computer program that implements the functions described in the embodiment is supplied to the A-ECU and is read and executed by one or more processors of the A-ECU. The computer program may be provided to a computer by being stored in a non-transitory computer-readable storage medium connectable to a system bus of the computer, or may be provided to the computer via a network. The non-transitory computer-readable storage medium is a recording medium in which information such as data and programs is stored by an electric, magnetic, optical, mechanical, or chemical action and is readable by a computer or the like. Examples of the recording medium include any types of disk or disc such as magnetic disks (for example, a floppy (registered trademark) disk and a hard disk drive (HDD)) and optical discs (for example, a compact disc read only memory (CD-ROM), a DVD, and a Blu-ray disc). Examples of the recording medium also include a read only memory (ROM), a random access memory (RAM), an EPROM, an electrically erasable programmable ROM (EEPROM), a magnetic card, a flash memory, an optical card, and a solid state drive (SSD).

What is claimed is:

1. A vehicle control device comprising a controller configured to execute:
   receiving a remote signal containing a target temperature in a cabin and an expected traveling start time of a vehicle from a remote controller used by a user of the vehicle;
   performing preheating of the cabin in a second air-conditioning mode when a temperature in the cabin is predicted to be increasable to the target temperature in the second air-conditioning mode before the expected traveling start time, the second air-conditioning mode being an air-conditioning mode in which the preheating is performed by using an electric heat pump, the preheating being based on a remote operation; and
   performing the preheating of the cabin in a first air-conditioning mode when the temperature in the cabin is predicted not to be increasable to the target temperature in the second air-conditioning mode before the expected traveling start time, the first air-conditioning mode being an air-conditioning mode in which the preheating is performed by using exhaust heat generated when an internal combustion engine operates.

2. The vehicle control device according to claim 1, wherein the controller is configured to further execute, when the temperature in the cabin is predicted not to be increasable to the target temperature in the second air-conditioning mode before the expected traveling start time:
   transmitting, to the remote controller, a signal for prompting the user to select whether to permit execution of the preheating in the first air-conditioning mode; and
   performing the preheating in the first air-conditioning mode when the controller receives a signal for permitting the execution of the preheating in the first air-conditioning mode from the remote controller.

3. The vehicle control device according to claim 2, wherein the controller is configured to further execute, when the controller receives a signal for rejecting the execution of the preheating in the first air-conditioning mode from the remote controller:
   calculating a reachable temperature which is a temperature in the cabin that is predicted to reach in the second air-conditioning mode before the expected traveling start time;
   transmitting, to the remote controller, a signal for prompting the user to change the target temperature to the reachable temperature; and
   performing the preheating in the second air-conditioning mode when the controller receives a signal for permitting change of the target temperature to the reachable temperature from the remote controller.

4. The vehicle control device according to claim 3, wherein the controller is configured to determine the reachable temperature based on at least one of an outside air temperature at a time of reception of the remote signal, a time margin from the time of reception of the remote signal to the expected traveling start time, and a remaining charge level of a battery configured to supply electric power to the electric heat pump.

5. The vehicle control device according to claim 1, wherein the controller is configured to predict whether the temperature in the cabin is increasable to the target temperature in the second air-conditioning mode before the expected traveling start time based on at least one of an outside air temperature at a time of reception of the remote signal, a time margin from the time of reception of the remote signal to the expected traveling start time, and a remaining charge level of a battery configured to supply electric power to the electric heat pump.

6. The vehicle control device according to claim 5, wherein the controller is configured to predict that the temperature in the cabin is not increasable to the target temperature in the second air-conditioning mode before the expected traveling start time when the outside air temperature at the time of reception of the remote signal is lower than a predetermined lower limit value.

7. The vehicle control device according to claim 5, wherein the controller is configured to predict that the temperature in the cabin is not increasable to the target temperature in the second air-conditioning mode before the expected traveling start time when a period required to increase the temperature in the cabin to the target temperature in the second air-conditioning mode is longer than the time margin.

8. The vehicle control device according to claim 5, wherein the controller is configured to predict that the temperature in the cabin is not increasable to the target temperature in the second air-conditioning mode before the expected traveling start time when a consumption of the battery that is required to increase the temperature in the cabin to the target temperature in the second air-conditioning mode is higher than the remaining charge level of the battery.

9. A vehicle control method comprising:
   receiving, by a computer, a remote signal containing a target temperature in a cabin and an expected traveling start time of a vehicle from a remote controller used by a user of the vehicle;
   performing, by the computer, preheating of the cabin in a second air-conditioning mode when a temperature in the cabin is predicted to be increasable to the target temperature in the second air-conditioning mode before the expected traveling start time, the second air-conditioning mode being an air-conditioning mode in which the preheating is performed by using an electric heat pump, the preheating being based on a remote operation; and
   performing, by the computer, the preheating of the cabin in a first air-conditioning mode when the temperature in the cabin is predicted not to be increasable to the target temperature in the second air-conditioning mode before the expected traveling start time, the first air-conditioning mode being an air-conditioning mode in which the preheating is performed by using exhaust heat generated when an internal combustion engine operates.

10. The vehicle control method according to claim 9, further comprising:
   transmitting, by the computer, when the temperature in the cabin is predicted not to be increasable to the target temperature in the second air-conditioning mode before the expected traveling start time, to the remote controller, a signal for prompting the user to select whether to permit execution of the preheating in the first air-conditioning mode; and
   performing, by the computer, the preheating in the first air-conditioning mode when the computer receives a signal for permitting the execution of the preheating in the first air-conditioning mode from the remote controller.

11. The vehicle control method according to claim 10, further comprising:
calculating, by the computer, when the computer receives a signal for rejecting the execution of the preheating in the first air-conditioning mode from the remote controller, a reachable temperature which is a temperature in the cabin that is predicted to reach in the second air-conditioning mode before the expected traveling start time;
transmitting, by the computer, to the remote controller, a signal for prompting the user to change the target temperature to the reachable temperature; and
performing, by the computer, the preheating in the second air-conditioning mode when the computer receives a signal for permitting change of the target temperature to the reachable temperature from the remote controller.

12. The vehicle control method according to claim 11, wherein the reachable temperature is determined based on at least one of an outside air temperature at a time of reception of the remote signal, a time margin from the time of reception of the remote signal to the expected traveling start time, and a remaining charge level of a battery configured to supply electric power to the electric heat pump.

13. The vehicle control method according to claim 9, wherein prediction is made whether the temperature in the cabin is increasable to the target temperature in the second air-conditioning mode before the expected traveling start time based on at least one of an outside air temperature at a time of reception of the remote signal, a time margin from the time of reception of the remote signal to the expected traveling start time, and a remaining charge level of a battery configured to supply electric power to the electric heat pump.

14. The vehicle control method according to claim 13, further comprising predicting, by the computer, that the temperature in the cabin is not increasable to the target temperature in the second air-conditioning mode before the expected traveling start time when the outside air temperature at the time of reception of the remote signal is lower than a predetermined lower limit value.

15. The vehicle control method according to claim 13, further comprising predicting, by the computer, that the temperature in the cabin is not increasable to the target temperature in the second air-conditioning mode before the expected traveling start time when a period required to increase the temperature in the cabin to the target temperature in the second air-conditioning mode is longer than the time margin.

16. The vehicle control method according to claim 13, further comprising predicting, by the computer, that the temperature in the cabin is not increasable to the target temperature in the second air-conditioning mode before the expected traveling start time when a consumption of the battery that is required to increase the temperature in the cabin to the target temperature in the second air-conditioning mode is higher than the remaining charge level of the battery.

17. A non-transitory storage medium storing instructions that are executable by a computer and that cause the computer to perform functions comprising:
receiving a remote signal containing a target temperature in a cabin and an expected traveling start time of a vehicle from a remote controller used by a user of the vehicle;
performing preheating of the cabin in a second air-conditioning mode when a temperature in the cabin is predicted to be increasable to the target temperature in the second air-conditioning mode before the expected traveling start time, the second air-conditioning mode being an air-conditioning mode in which the preheating is performed by using an electric heat pump, the preheating being based on a remote operation; and
performing the preheating of the cabin in a first air-conditioning mode when the temperature in the cabin is predicted not to be increasable to the target temperature in the second air-conditioning mode before the expected traveling start time, the first air-conditioning mode being an air-conditioning mode in which the preheating is performed by using exhaust heat generated when an internal combustion engine operates.

18. A vehicle control system comprising:
a remote controller to be used by a user of a vehicle, the remote controller being configured to, when a preheating request containing a target temperature in a cabin and an expected traveling start time of the vehicle is received, transmit a remote signal containing the target temperature and the expected traveling start time; and
a control device configured to, when the control device receives the remote signal from the remote controller, perform preheating of the cabin based on the target temperature and the expected traveling start time, the control device including a controller configured to, when the remote signal is received:
perform the preheating in a second air-conditioning mode when a temperature in the cabin is predicted to be increasable to the target temperature in the second air-conditioning mode before the expected traveling start time, the second air-conditioning mode being an air-conditioning mode in which the preheating is performed by using an electric heat pump; and
perform the preheating in a first air-conditioning mode when the temperature in the cabin is predicted not to be increasable to the target temperature in the second air-conditioning mode before the expected traveling start time, the first air-conditioning mode being an air-conditioning mode in which the preheating is performed by using exhaust heat generated when an internal combustion engine operates.

19. The vehicle control system according to claim 18, wherein the controller is further configured to, when the temperature in the cabin is predicted not to be increasable to the target temperature in the second air-conditioning mode before the expected traveling start time:
transmit, to the remote controller, a signal for prompting the user of the vehicle to select whether to permit execution of the preheating in the first air-conditioning mode; and
perform the preheating in the first air-conditioning mode when the controller receives a signal for permitting the execution of the preheating in the first air-conditioning mode from the remote controller.

20. The vehicle control system according to claim 19, wherein the controller is further configured to, when the controller receives a signal for rejecting the execution of the preheating in the first air-conditioning mode from the remote controller:
calculate a reachable temperature, which is a temperature in the cabin that is predicted to reach in the second air-conditioning mode before the expected traveling start time;
transmit, to the remote controller, a signal for prompting the user to change the target temperature to the reachable temperature; and perform the preheating in the second air-conditioning mode when the controller receives a signal for permitting change of the target temperature to the reachable temperature from the remote controller.

* * * * *